Nov. 5, 1968 G. MECKLER 3,409,766
COMBINATION LIGHTING AND COOLING SYSTEM
Original Filed Sept. 25, 1961 10 Sheets-Sheet 1
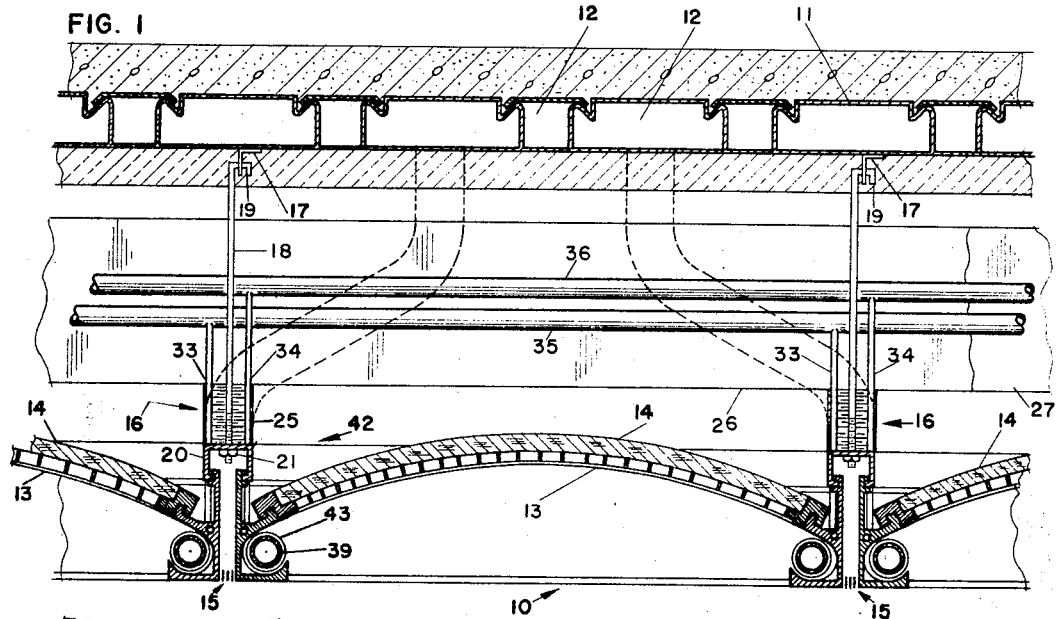
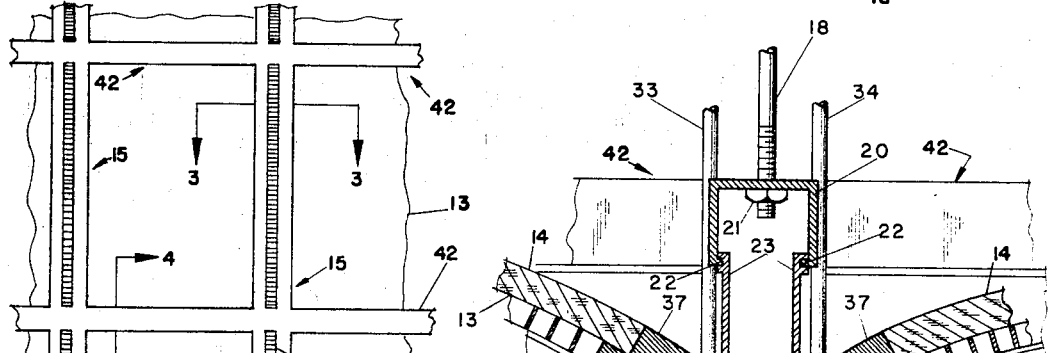
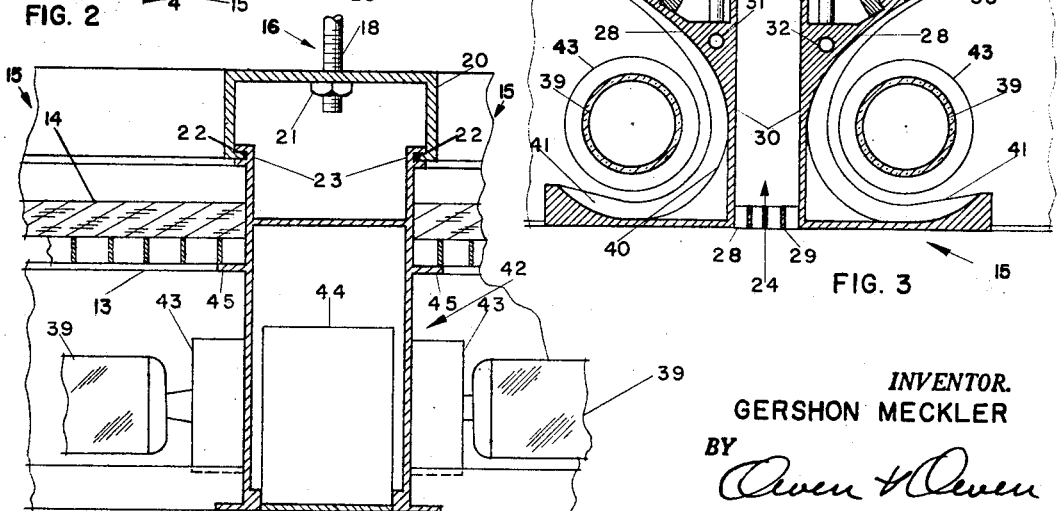
INVENTOR.
GERSHON MECKLER
BY Owen & Owen
ATTYS.

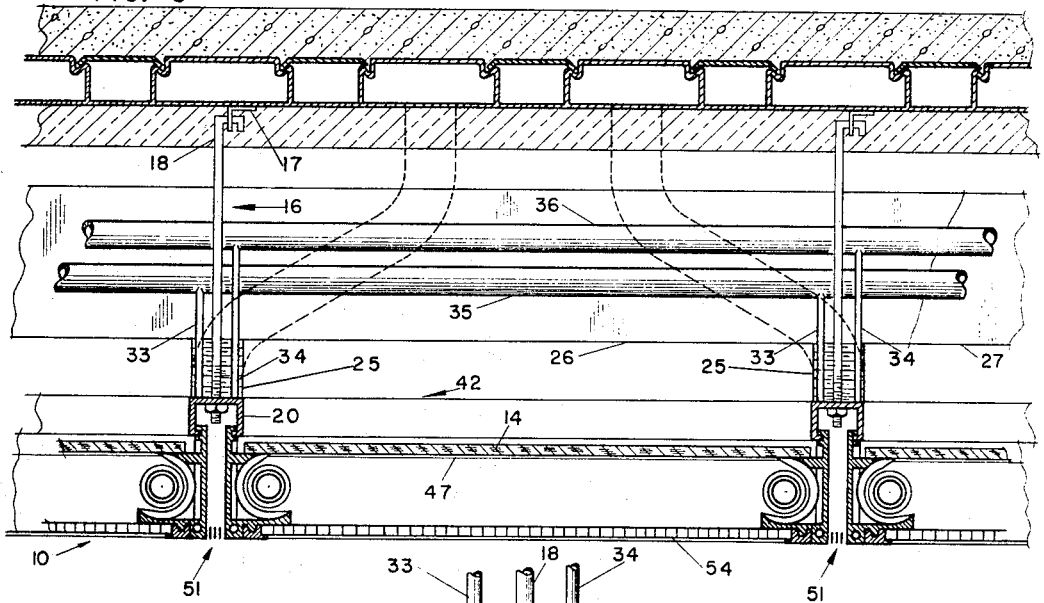
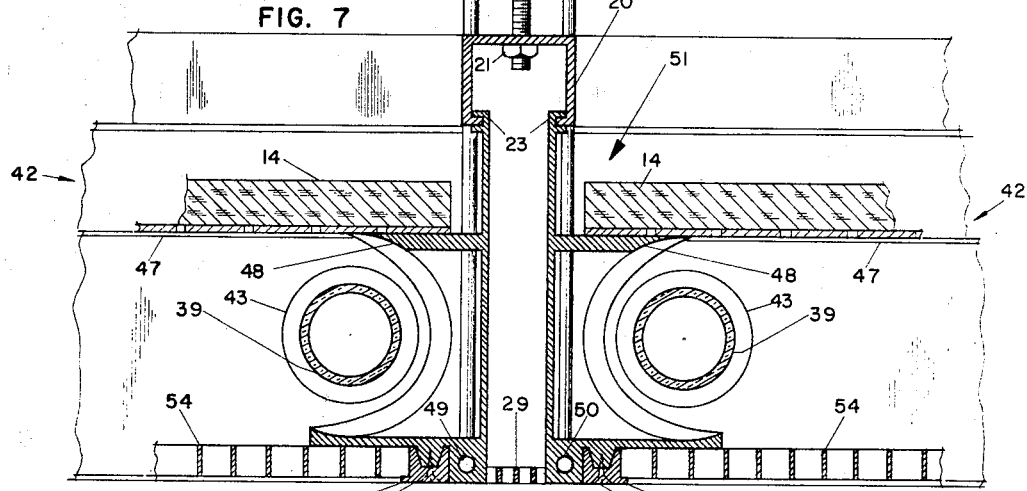
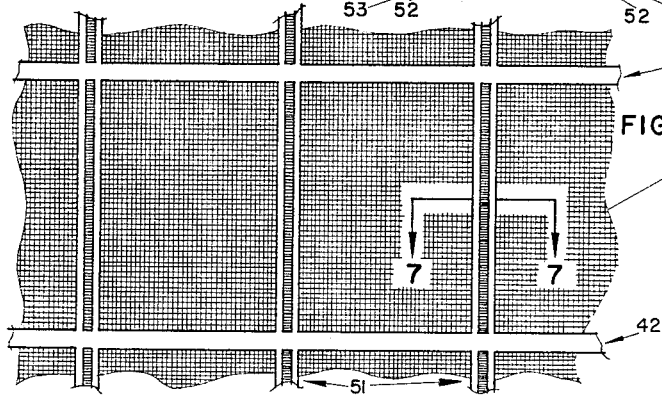
INVENTOR.
GERSHON MECKLER
BY Owen + Owen
ATTYS.

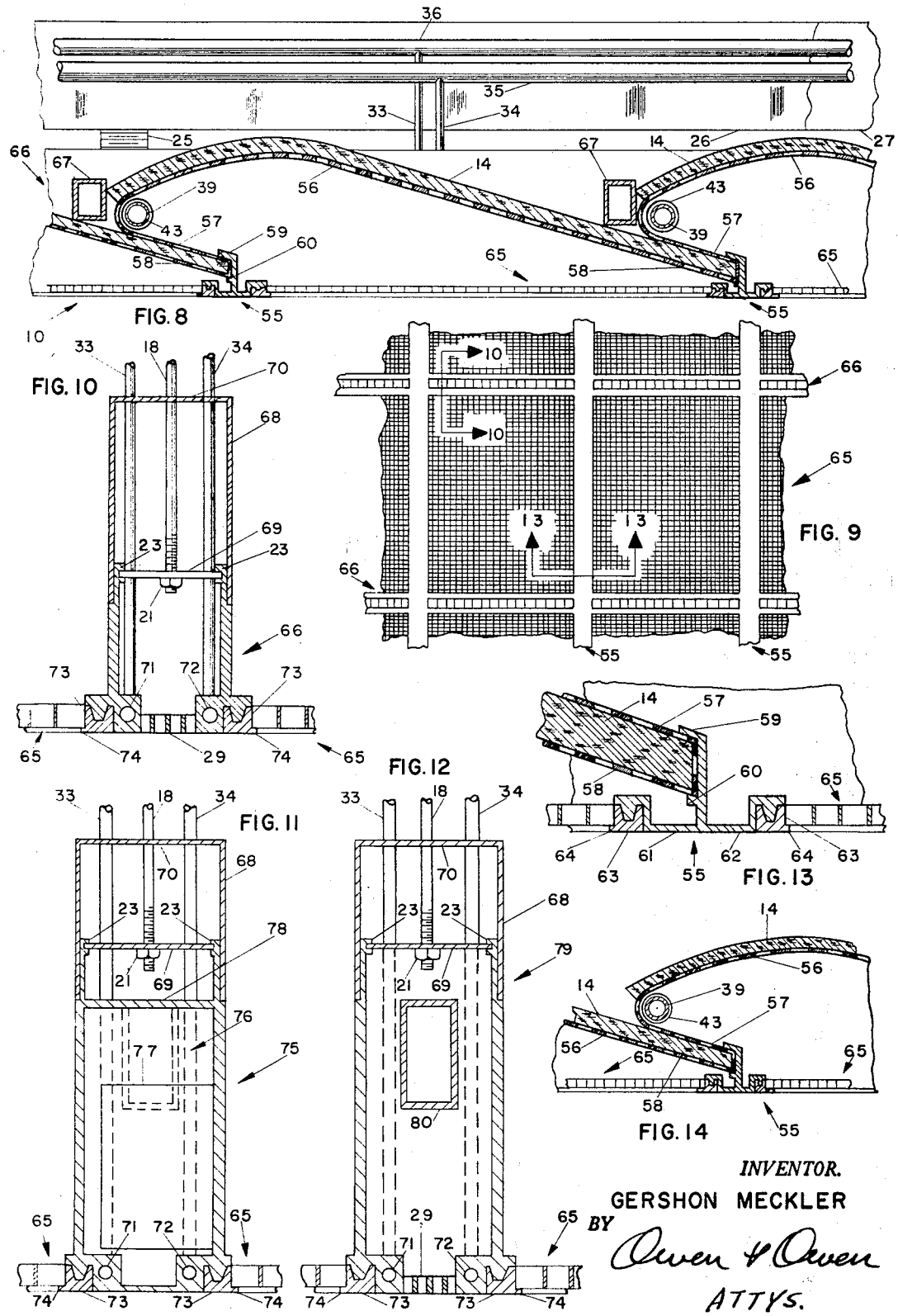

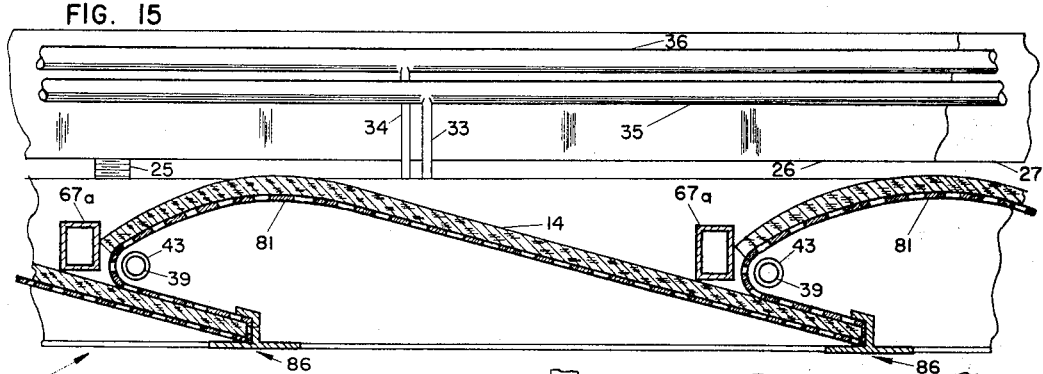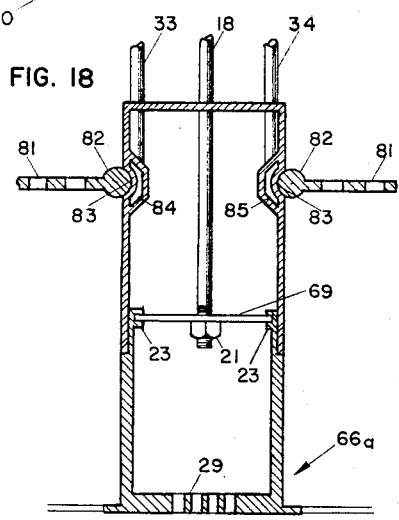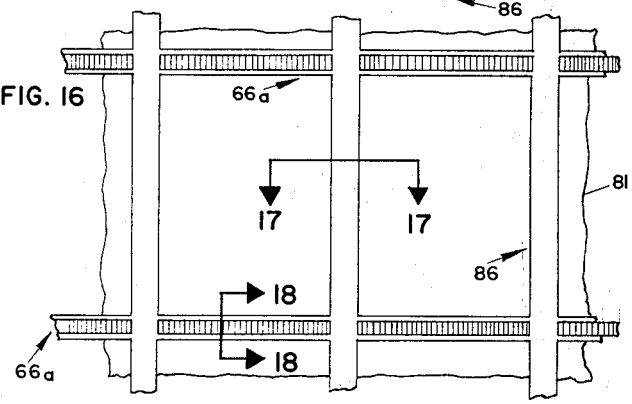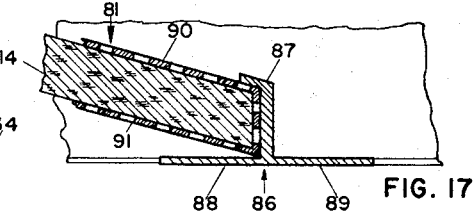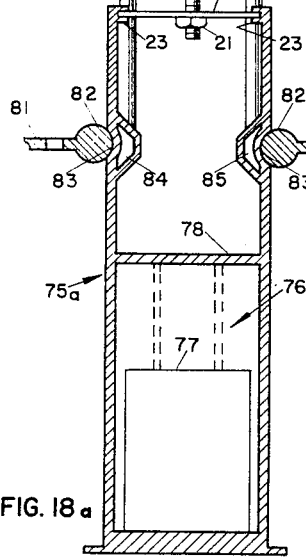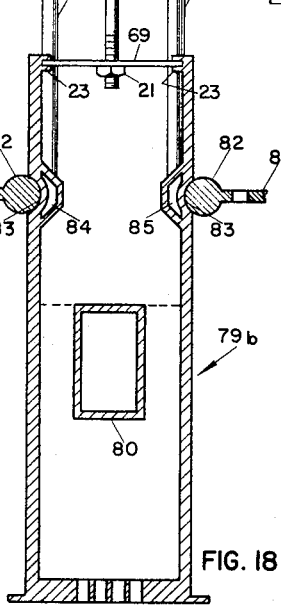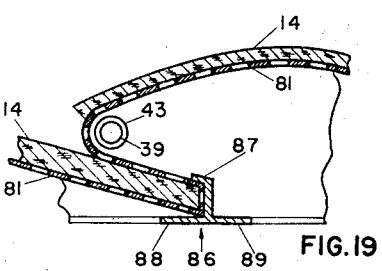

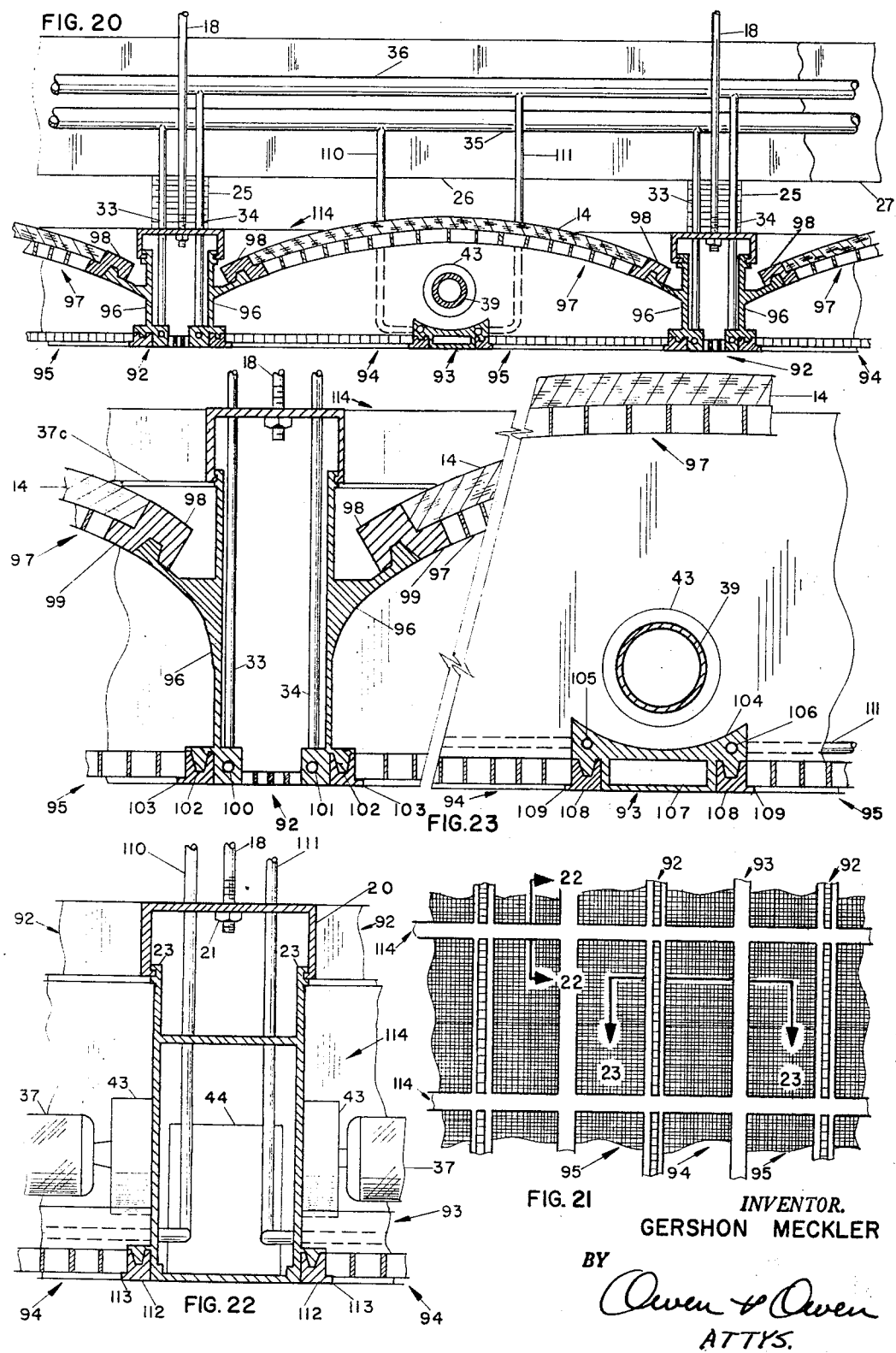

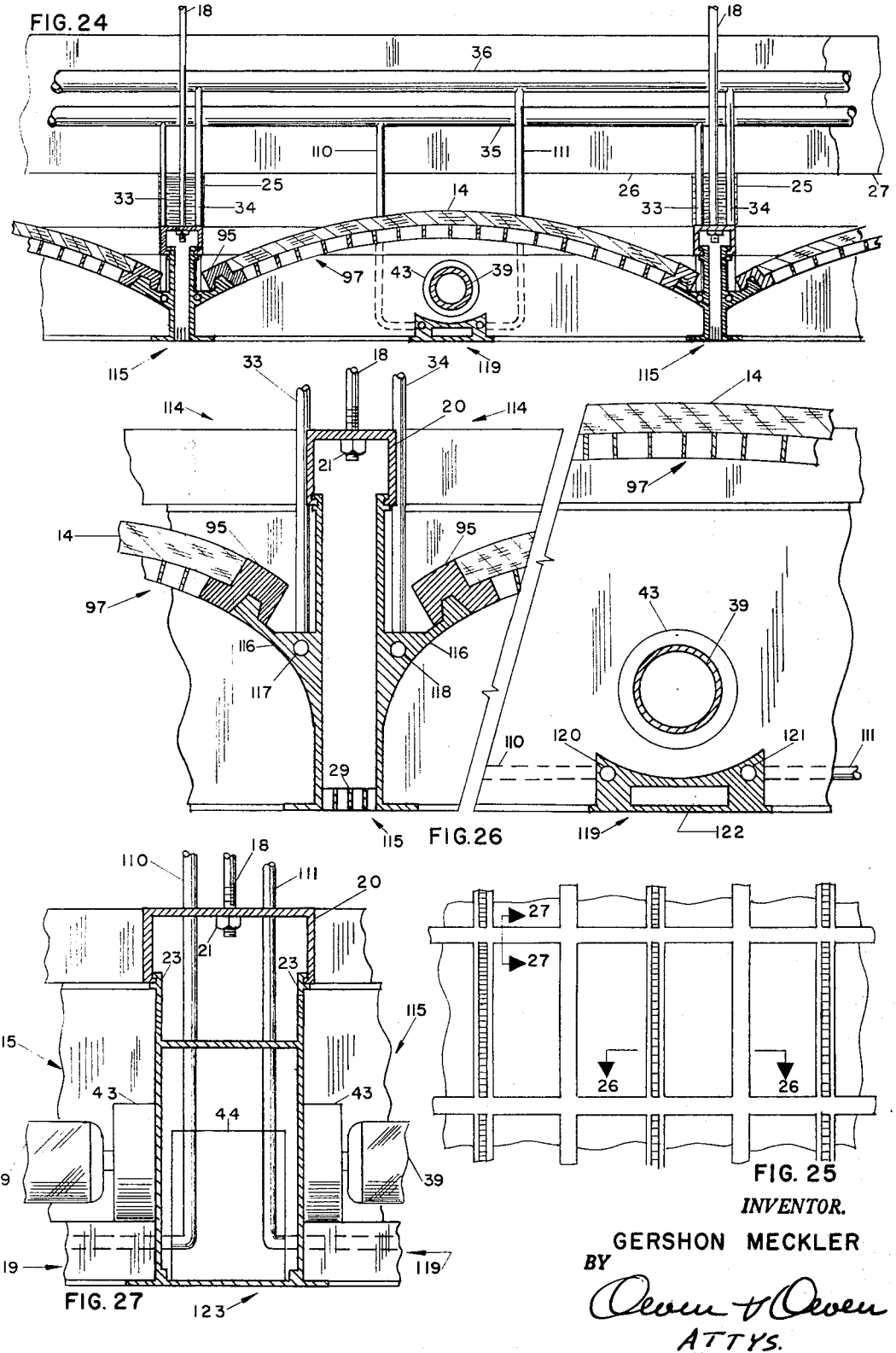

Nov. 5, 1968  G. MECKLER  3,409,766
COMBINATION LIGHTING AND COOLING SYSTEM
Original Filed Sept. 25, 1961  10 Sheets-Sheet 7

INVENTOR.
GERSHON MECKLER
BY
Owen & Owen
ATTYS.

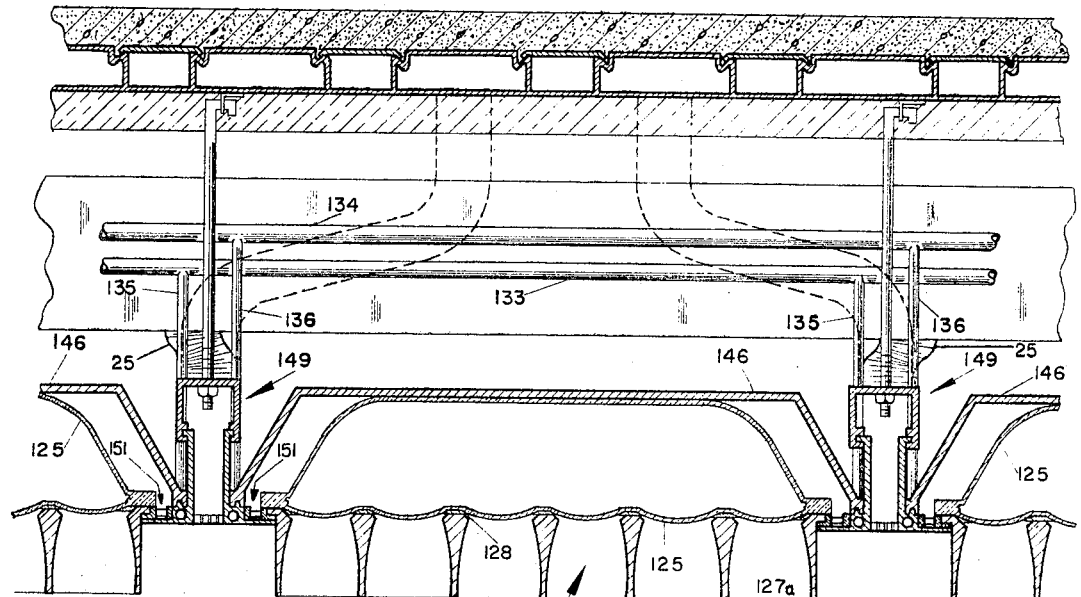
FIG. 31
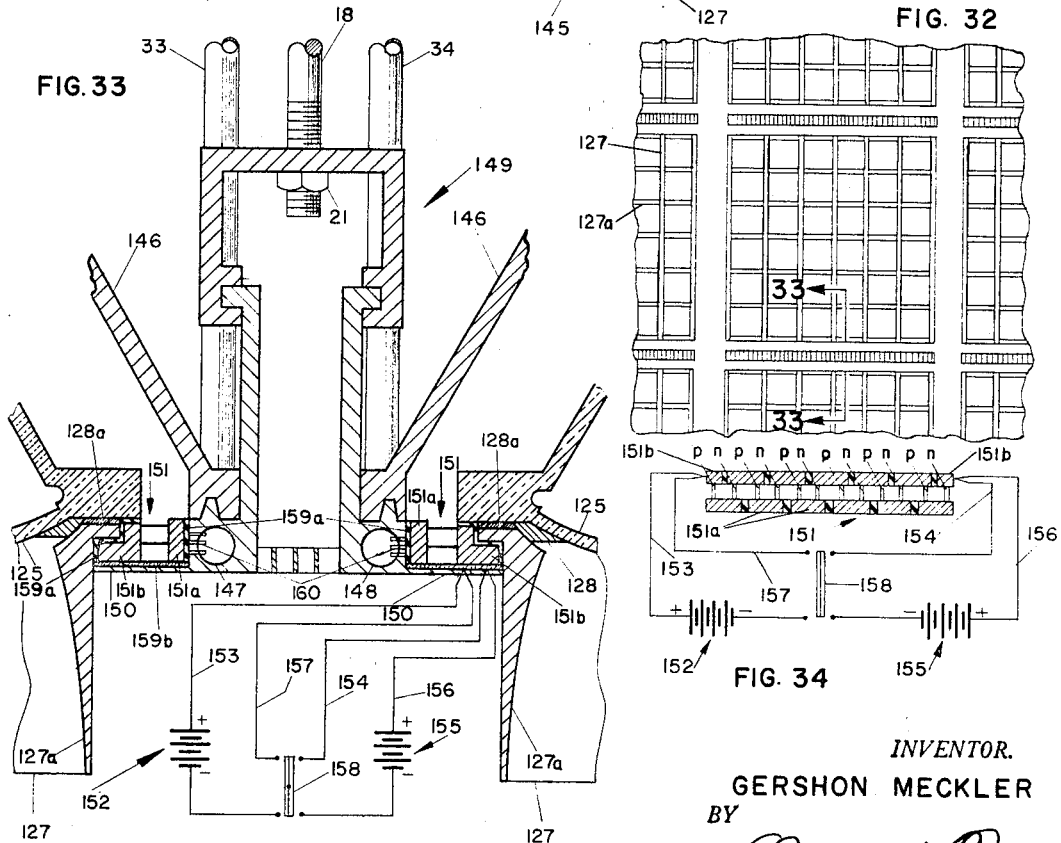
FIG. 32
FIG. 33
FIG. 34
INVENTOR.
GERSHON MECKLER
BY
Owen & Owen
ATTYS.

Nov. 5, 1968     G. MECKLER     3,409,766
COMBINATION LIGHTING AND COOLING SYSTEM
Original Filed Sept. 25, 1961     10 Sheets-Sheet 9

INVENTOR.
GERSHON MECKLER
BY
Owen + Owen
ATTYS.

INVENTOR.
GERSHON MECKLER
BY
Owen & Owen
ATTYS.

United States Patent Office 3,409,766
Patented Nov. 5, 1968

3,409,766
COMBINATION LIGHTING AND COOLING SYSTEM
Gershon Meckler, Toledo, Ohio, assignor, by mesne assignments, to Lithonia Lighting, Inc., a corporation of Georgia
Continuation of application Ser. No. 140,416, Sept. 25, 1961, which is a continuation-in-part of application Ser. No. 31,902, May 26, 1960. This application Jan. 4, 1967, Ser. No. 607,333
8 Claims. (Cl. 240—47)

ABSTRACT OF THE DISCLOSURE

A ceiling system for providing both lighting and space temperature control within a building enclosure. The device comprises a louvered light diffuser disposed beneath light sources that diffuse the light emitted from the light sources, remove the heat from both the light sources and the lighted space, and control the brightness of the light. Heat absorbed by the ceiling panels, reflectors and light diffusers is removed from the ceiling panels and reflectors by cooled water from a cooling tower, and from the light diffusers by lower temperature chilled water.

---

This application is a continuation of my copending application Ser. No. 140,416, filed Sept. 25, 1961, now abandoned, which is a continuation-in-part of my copending application Ser. No. 31,902 which was filed on May 26, 1960, now abandoned.

This invention relates to a ceiling system for a building having both electrical and mechanical systems integrated with the building structure in such a manner that each structural and/or system component performs as many functions as possible to combine the environment within the building with the building structure. The ceiling system is utilized in a building having dynamic integration wherein two or more building systems are combined in such a manner as to increase the efficiency and to reduce the net energy requirements of the integrated building system in contrast with static integration wherein the building system components are merely combined physically without affecting their related system energy requirements.

The ceiling systems of the present invention and of my copending application Ser. No. 31,902 provide both lighting and space temperature control in the building enclosure, and the systems utilize either a luminous ceiling or a plurality of spaced fixtures. These ceiling systems provide artificial lighting integrated with radiant cooling over a broad area when either the luminous ceiling or the spaced fixtures are used. Also the ceiling systems insure great architectural freedom by integrating lighting and cooling to enable space and environment to be arranged in any desired combination whereby building volume is greatly conserved because all lighting and cooling means are disposed in the ceiling. Since a significant portion of the sensible heat load within the building is removed by water circuits a lesser quantity of air is circulated which enables smaller riser ducts and less air handling equipment to be used thereby making available more usable floor space. Also pipes for carrying liquid heat transfer media consume less volume than air carrying ducts. Consider the relative heat transfer ability of air and water to transfer space load from the environment to the central refrigeration plant. For example, if we compare a conventional low pressure air system with a 20° F. temperature rise to a water system operating at a velocity of 6 feet per second with a 10° F. temperature rise, the ratio of duct area to pipe area necessary to distribute cold air and water respectively is approximately 350 to 1. For a high velocity system with 3,000 feet per minute in the duct, the ratio becomes a 210 to 1. When one considers the saving in building volume utilizing water to remove heat, it becomes apparent these figures indicate the order of magnitude which affect the non-productive volume of the building.

The systems of the invention employ ceiling panels and luminaire reflectors which have the dual function of diffusing the light and of radiantly cooling the enclosure by removing heat emitted from artificial light sources, ballasts, and other heat emitting sources. Certain of the systems further utilize louvered light diffusers disposed beneath the light sources, and these diffusers are preferably in the form of grids which have the dual function of diffusing the emitted light and of removing heat emitted by the above-mentioned sources. A louvered light diffuser is much more effective for removing heat than a flat surface because it has a greater area exposed to source of heat. Radiation heat transfer is directly proportional to the product of this exposed area of the absorber and the temperature difference between the emitter and absorber to the fourth power. The geometry of the ceiling system is such that the ratio of the louver surface area exposed to the light source which is at a high temperature is low with respect to the area exposed to the occupied space at a lower temperature. However, because of the high temperature difference between the light source and the louver a significant amount of heat is captured directly by the same louver which is able to remove a large amount of heat from the lower temperature space.

Absorbed heat is removed from the ceiling panels, reflectors, and the light diffusers by heat exchange means connected to a building heat transfer system which is preferably of the type shown in my copending application Ser. No. 722,883, filed Mar. 21, 1958, now Patent No. 3,102,339. Cooled water from a suitable source such as a cooling tower is used to remove heat from the panels and reflectors while lower temperature chilled water from a refrigerator removes heat from the light diffusers. Because of the greater viewing ability of the louver the chilled water can be at a relatively high temperature which not only is less expensive to provide but also enables the air conditioning system to operate at a relatively high humidity without condensation on the water pipes. Both the cooled water and the chilled water remove the heat at a temperature as close to that of the heat source as possible for greater operating efficiency and lower cost.

Not only does the present invention contemplate the use of high output light sources which operate at elevated temperatures but also the invention is concerned with controlling the brightness of the light for optimum lighting efficiency by the selective absorption of the infrared portion of the light and the maintenance of a uniform temperature of optimum value along the surface of the artificial light source. This is accomplished by removing heat from the light source by conduction and radiation while reducing convection currents to a minimum. Also by placing the artificial light sources in the proper environment more energy input is converted into light and less energy must be removed as heat. Thus fewer light sources are required to provide a predetermined lighting intensity.

It is, therefore, an object of the invention to provide structural and/or system components for a dynamically integrated building in which two or more building systems are combined to insure direct interaction of system energies in such a fashion as to increase the operating efficiency and to reduce the net energy requirements of the building system.

Another object of the invention is to provide a ceiling system which utilizes louvered light diffusers for removing heat from both the light sources and the lighted space as well as for controlling the brightness of the light.

A further object of the invention is to provide a ceiling system for an integrated building structure having a minimum input energy requirement for the combined building systems.

A still further object of the invention is to provide a ceiling system for an integrated building structure having high lighting intensity requirements and limited space available for conveying heat transfer media.

Another object of the invention is to provide a structure for supporting ceiling panels, for diffusing the emitted light from artificial sources, for cooling or heating the enclosure, and for providing a duct for the transmission of air either to or from the enclosure.

Other objects of the invention will be apparent from the specification which follows and from the drawings in which like numbers are used throughout to identify like parts.

In the drawings:

FIGURE 1 is a cross-sectional elevation view of one form of the ceiling system;

FIGURE 2 is a schematic view showing the gridlike pattern of the ceiling components of FIGURE 1 as viewed from below the ceiling;

FIGURE 3 is a cross-sectional view taken along line 3—3 of FIGURE 2;

FIGURE 4 is a cross-sectional view taken along line 4—4 of FIGURE 2;

FIGURE 5 is a cross-sectional elevation view of another form of the ceiling system;

FIGURE 6 is a schematic view showing the gridlike pattern of the ceiling components of FIGURE 5 as viewed from below the ceiling;

FIGURE 7 is a cross-sectional view taken along line 7—7 of FIGURE 6;

FIGURE 8 is a cross-sectional elevation view of another form of the ceiling system;

FIGURE 9 is a schematic view showing the gridlike pattern of the ceiling components of FIGURE 8 as viewed from below the ceiling;

FIGURE 10 is a cross-sectional view taken along line 10—10 of FIGURE 9;

FIGURES 11 and 12 are each modifications of the structure shown in FIGURE 10;

FIGURE 13 is a cross-sectional view taken along line 13—13 of FIGURE 9;

FIGURE 14 is a view of a portion of the ceiling system of FIGURE 8 omitting the electrical raceway;

FIGURE 15 is a cross-sectional elevation view of another form of the ceiling system;

FIGURE 16 is a schematic view showing the gridlike pattern of the ceiling components of FIGURE 15 as viewed from below the ceiling;

FIGURE 17 is a cross-sectional view taken along line 17—17 of FIGURE 16;

FIGURE 18 is a cross-sectional view taken along line 18—18 of FIGURE 16;

FIGURE 18a is a cross-sectional view of one modification of the structure of FIGURE 18;

FIGURE 18b is a cross-sectional view of another modification of the structure of FIGURE 18;

FIGURE 19 is a view of a portion of the ceiling system of FIGURE 15 omitting the electrical raceway;

FIGURE 20 is a cross-sectional elevation view of another form of the ceiling system;

FIGURE 21 is a schematic view showing the gridlike pattern of the ceiling components of FIGURE 20 as viewed from below the ceiling;

FIGURE 22 is a cross-sectional view taken along line 22—22 of FIGURE 21;

FIGURE 23 is a cross-sectional view taken along line 23—23 of FIGURE 21;

FIGURE 24 is a cross-sectional elevation view of another form of the ceiling system;

FIGURE 25 is a schematic view showing the gridlike pattern of the ceiling components of FIGURE 24 as viewed from below the ceiling;

FIGURE 26 is a cross-sectional view taken along line 26—26 of FIGURE 25;

FIGURE 27 is a cross-sectional view taken along line 27—27 of FIGURE 25;

FIGURE 31 is a cross-sectional elevation view of another form of the ceiling system;

FIGURE 32 is a schematic view showing the gridlike pattern of the ceiling components of FIGURE 31 as viewed from below the ceiling;

FIGURE 33 is a cross-sectional view taken along line 33—33 of FIGURE 32;

FIGURE 34 is a diagrammatic view showing a portion of the electrical circuitry of the ceiling system shown in FIGURE 31;

Figure 28:
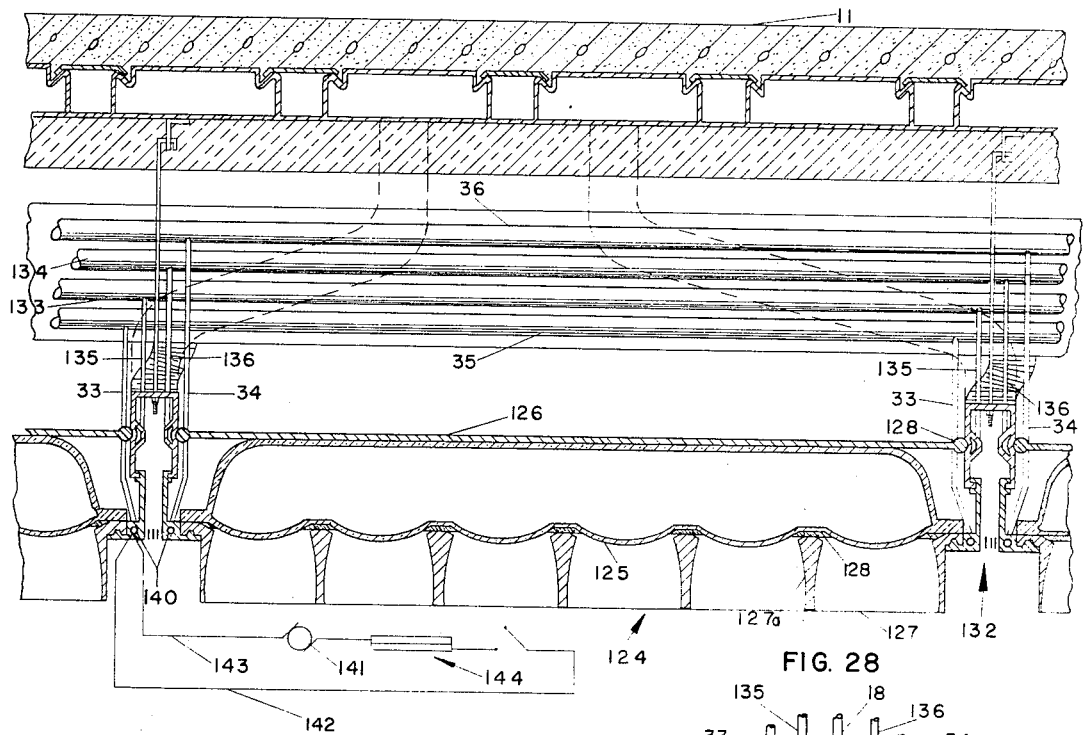
FIGURE 28 is a cross-sectional elevation view of another form of the ceiling system.

Certain concepts permeate all of the forms of the invention which utilize a luminous ceiling. For example, all of the embodiments of the luminous ceiling provide a reflector or reflective surface for directing the emitted light against the ceiling panels which, in turn, reflect and diffuse the light into the enclosure which lies beneath the ceiling. The reflectors or reflective surfaces are preferably roughened or embossed so that the light which is emitted from the lamps is diffused as well as reflected.

Passages for conducting a cooling medium are disposed immediately adjacent and contiguous to either the sides or the ends of louvered light diffusers that are used with certain of the luminous ceilings and the lighting fixtures constructed according to the invention, and similar passages are likewise disposed relative to the sides of the ceiling panels and reflectors used with the fixtures. Due to their close disposition, heat is readily transferred from either the ceiling panels or the fixture reflectors, as the case may be, as well as from the louvered light diffusers. In the luminous ceiling the transfer of heat is mainly either to the ceiling panels or to the light diffusers depending upon the location of the cooling passages; for example, as regards the structures of FIGURE 3, the main cooling is through the ceiling panels, whereas as regards the structure of FIGURE 7, the main cooling is through the light diffusers. There is, however, some cooling of ceiling panel of FIGURE 7 even though the cooling passages are not in close proximity thereto. It is to be understood that there is also radiant cooling of the lamps which are ordinarily of the high intensity type.

Referring to the drawings, FIGURE 1 shows a ceiling 10 suspended from a cellular steel deck-panel 11. It is convenient to employ a cellular steel deck-panel having concrete fills because it includes longitudinally extending cells 12 which form electrical raceways for carrying electrical wires and ducts for carrying air. When such a deck-panel 11 is provided its underside need not be fire-proofed. The ceiling 10 comprises a plurality of adjacent louvered ceiling panels 13 formed into a grid-like pattern as best shown in FIGURE 2. The ceiling panels 13 support on their upper surfaces an acoustical material 14 which aids in deadening sounds from either above the deck-panel 11 or from within the enclosure. The ceiling panels 13 are either louvered or perforated, and the sound waves which reach the acoustical material 14 are deadened thereby.

A structure 15 is hung from the deck-panel 11 by a hanger 16 which comprises a hanger support bracket 17 secured to the under side of the deck-panel 11 and a hanger rod 18. As shown in FIGURE 1 the hanger rod 18 is curved at its uper end 19 for engagement with the hanger bracket 17 and is threaded at its lower end to permit adjustment of the ceiling panels 13. The lower end of the hanger rod 18 passes through an aperture in a flanged bracket 20 and is fitted with a nut 21. As shown in FIG. 3 flanges 22 on the flanged bracket 20 engage the structure 15 between bifurcated portions 23. In assembling the ceiling a flanged bracket 20 is simply slid between the bifurcated portions 23 of the structure at each end. The structure 15 provides a longitudinally extending duct 24 for the transmission of air either to or from the enclosure. The upper surface of the structure 15 has one or more openings (not shown) along the longitudinal length thereof which open into one or more flexible ducts 25. The flexible ducts 25 open into a supply or return header duct system which preferably are separate ducts 26 and 27 respectively.

Various arrangements for supplying air to the enclosure and for returning air to an air conditioner (not shown) can be provided. For example, the structures 15 can be alternately connected to the supply and return ducts 26 and 27 through their associated ducts 25 as shown in FIG. 1. On the other hand, all of the ducts 24 on one side of the enclosure can be connected to and supplied with air from the duct 26 through their associated ducts 25, while all the ducts 24 on the other side of the enclosure can be connected to and return air to the return duct 27 through their associated ducts 25. Alternatively, as shown by the dotted lines in FIGURE 1, the ducts 25 can be connected to cells 12, some of which can be employed to supply air to the enclosure and others of which can be employed to return air to an air conditioner (not shown).

The duct 24 in the structure 15 has one or more openings 28 at its lower end which contain louvered air diffusers 29 for diffusing the air as it enters the enclosure. The structure 15 has a pair of spaced, vertically extending arms 30 which support adjacent ceiling panels 13. The arms 30 are each provided with cooling passages 31 and 32 through which a suitable cooling medium, preferably water, passes. The passages 31 and 32 extend the longitudinal length of the structure 15. Vertical conduits 33 and 34 lead into one of the ends of passages 31 and 32 at one end of the structure 15. Various arrangements for supplying a cooling medium such as chilled water to the structures 15 and for returning the cooling medium to a refrigeration unit (not shown) can be provided. When relatively short structures 15 are employed or great cooling is not required it is preferred to couple the other ends of passages 31 and 32 together while conduit 33 is connected to lead from a supply header conduit 35 into passage 31 and conduit 34 leads from passage 32 into a return header conduit 36. The conduits 35 and 36 form a portion of the first stage of a building heat transfer system which circulates chilled water at a temperature in the range of 65° to 75° F. around the spaces within the building. Alternatively, the conduits 33 and 34 can each lead from the supply header conduit 35 into their respective passages 31 and 32 which, in turn, lead into conduits (not shown) which return the cooling medium to the return header conduit 36.

The arms 30 of the structure 15 also support the ceiling panels 13. A structural member 37 is keyed and secured to each of the arms 30. The structural member 37 abuts the side of the ceiling panel 13 and the acoustical material 14 rests on a flange 38 thereof. The weight of the ceiling panels 13 urges them into close abutment with the structural members 37. The ends of the panels can be welded or soldered directly to the structural members 37, if desired. A reflective surface can be provided on each side of the structure 15 for reflecting the light emitted by lamps 39. The surface may be thus provided by coating the arcuate, concave portion 40 with a reflective material or by securing a reflector 41 to the arcuate portion 40 as shown in FIGURE 3. The reflective surface or reflector 41 is preferably embossed to afford greater diffusion of the emitted light.

The structure 15 is preferably extruded and is preferably composed of a material, for example aluminum, which is a good conductor of heat. The ceiling panels 13 are preferably made of either a louvered construction or of perforated sheet metal, steel or aluminum being preferable since they are good conductors of heat. It is apparent that the lamps 39 are radiantly cooled by the structure 15, and since the structure 15 makes metal-to-metal abutting contact with the ceiling panels 13 heat is removed from the ceiling panels. Due to the removal of the heat emitted by the lamps 39 and the removal of heat from the air which contacts the cooled ceiling panels 13 the enclosure below the ceiling 10 is, in turn, cooled.

The lamps 39, which are preferably of the fluorescent type and of high intensity, are mounted on a structure 42 by receptacle brackets 43 as shown in FIGURE 4. Leads (not shown) extend from the receptacle brackets 43 into a ballast 44. The structure 42 has a hanger 16 identical in construction to that of FIGURE 1. The structure 42 is provided with oppositely extending flanges 45 which aid in supporting the ceiling panels 13 at their ends. The ballast 44 or ballasts, as the case may be, are held in place by a removable bottom plate 46. Structure 42 is also preferably extruded.

The structure of FIGURES 5, 6 and 7 is similar to that of FIGURES 1 to 4 inclusive. In this form of the invention, however, flat perforated ceiling panels 47 are provided. Accordingly, arms 48 which are a modified form of the arms 30 disclosed in FIGURE 3 support the ceiling panels 47 as well as the insulation material 14. Passages 49 and 50 are disposed within the lower end of a structure 51. The conduits 33 and 34 supply and return the cooling medium to the passages 49 and 50 in the manner discussed with respect to FIGURE 1. Structural members 52 are keyed and suitably attached to the structure 51 at its lower end immediately adjacent passages 49 and 50. The structural members 52 have small flanges 53 that support light diffusers 54 which are preferably of a louvered construction and composed of a good conductor of heat such as steel or aluminum. The heat emitted from the lamps 39 is removed by radiant cooling, and since heat is removed from the air which contacts the louvered light diffusers 54 the enclosure is cooled.

The form of the ceiling system disclosed in FIGURES 8 to 14, inclusive, includes an inverted substantially T-shaped support member 55 which supports two adjacent perforated ceiling panels 56 at opposed end portions 57 and 58 between a pair of flanges 59 and 60 as shown in FIGURE 13. Insulation material 14 is disposed above the ceiling panels 56 and extends to between the end portions 57 and 58 thereof. Arms 61 and 62 of the inverted T-shaped support member 55 are provided with structural members 63 which are keyed and attached to the support member 55. Flanges 64 support louvered light diffusers 65 along their side portions.

The support member 55 and the side portions of the light diffusers 65 are supported by any one of the structures of FIGURES 10, 11 or 12. The structure 66 of FIGURE 10 is employed where it is desired to provide for the transmission of air where at the same time an electrical raceway 67 is mounted in close proximity to the lamps 39 as shown in FIG. 8. A channel-shaped member 68 is suitably attached to the body of the structure 66, and the nut 21 which is fitted on the hanger rod 18 engages the bottom of a plate 69. The plate 69 is fitted into the ends of the bifurcated portions 23 of the structure 66. The web 70 of the channel-shaped member 68 is provided with at least one aperture for enabling air to be supplied to or exhausted from the enclosure through the air diffusers 29. This air is transported by a duct 25 in the manner previously described. Passages 71 and 72 are disposed within the lower end of the structure 66 and attached to the conduits 33 and 34 as previously described. Structural members 73 are keyed and attached to the structure 66 immediately adjacent the passages 71 and 72, and these structural members 73 are provided with flanges 74 which support the ends of the light diffusers 65 as well as the support member 55.

FIGURES 11 and 12 show structures similar to that shown in FIGURE 10. In the structure 75 of FIGURE 11 the provision of a duct for the transmission of air to or from the enclosure is omitted. The electrical raceway 67 is omitted from the position shown in FIGURE 8 to produce the radiant ceiling shown in FIGURE 14. Instead an electrical raceway 76 containing an electrical ballast 77 is disposed within the structure 75. A plate 78 completely confines the electrical raceway 76 and the ballast 77. A structure 79 in FIGURE 12 includes the same elements as does FIGURE 10 except an electrical raceway 80 is disposed inside the structure 79 instead of outside as shown in FIGURE 8.

The form of the ceiling structure shown in FIGURES 15 to 19, inclusive, does not include light diffusers. Perforated ceiling panels 81 are headed at their ends 82 and nest in oppositely facing concave recesses 83 located immediately adjacent passages 84 and 85 in a structure 66a. The cooling medium which enters the cooling passages 84 and 85 through the conduits 33 and 34 cools the adjacent ceiling panels 81. The lower portion of the structure 66a has an opening through which the air is transmitted to or from the enclosure through the ducts 25 and past the air diffusers 29 as previously described. Referring to FIGURE 17 there is shown an inverted, substantially T-shaped support member 86 which has a flange 87 and arms 88 and 89. Opposed end portions 90 and 91 of the ceiling panel 81 are supported and retained in position between the flange 87 and the arm 88.

The structure 75a of FIGURE 18a is similar to the structure 75 shown in FIGURE 11 in that no provision is made for the transmission of air to or from the enclosure. The electrical raceway 67a is omitted from the position shown in FIGURE 15 to produce the radiant ceiling shown in FIGURE 19. Instead the electrical raceway 76 containing the electrical ballast 77 is disposed within the structure 75a, and both the raceway 76 and ballast 77 are confined by the plate 78. In FIGURE 18b the structure 79b includes the same elements as does FIGURE 18 except the electrical raceway 80 is disposed inside the structure 79b instead of outside as shown in FIGURE 15.

FIGURES 20 to 23, inclusive disclose a form of the ceiling system wherein the cooling means are disposed not only in structures 92 but also in a structure 93 which lies horizontally between two adjacent spaced structures 92. Louvered light diffusers 94 and 95 are supported on their outer sides by the structures 92 and on their inner sides by the structure 93. The structure 92 has opposed, vetrically extending arms 96 which support adjacent louvered ceiling panels 97. A structural member 98 is keyed and secured to each of the arms 96 and abuts the end of the adjacent ceiling panel 97 while acoustical material 14 rests on a flange 99 thereof as shown in FIGURE 23. The lower end of the structure 92 has cooling passages 100 and 101 connected to conduits 33 and 34 respectively. A structural member 102 having flanges 103 is keyed and secured to the structural member 92 immediately adjacent each of the passages 100 and 101. The flanges 103 support the light diffusers 94 and 95 at each of their outer sides.

The structure 93 extends parallel to the structures 92 and is spaced horizontally therebetween. The structure 93 is somewhat wider than the lamp 39 and has a concave upper surface 104 as shown in FIGURE 23 which, though being reflective, is preferably embossed to aid in diffusing the emitted light. Passages 105 and 106 are disposed on opposite sides of the structure 93 below the upper surface 104. An electrical raceway 107 is formed in the structure 93 which is adapted to carry electrical wires. Immediately adjacent passages 105 and 106 are structural members 108 having flanges 109 which support the inner ends of the light diffusers 94 and 95. Conduits 110 and 111 are connected to the header conduits 35 and 36 respectively to supply and return the cooling medium to the respective passages 105 and 106. The ends of the structure 93 and the ends of the light diffusers 94 and 95 are supported on structural members 112 on flanges 113. The structural members 112 are keyed and secured to the lower end of a structure 114. The conduits 110 and 111 pass through apertures in the structure 114 and communicate with the passages 105 and 106.

The ceiling system shown in FIGURES 24 to 27, inclusive, includes a structure 115 which is similar to the structure 15, shown in FIGURE 1. However, the lamps 39 have been omitted from adjacent the structure 115, and the bottom of the duct included therein is closed with the exception of one or more openings for the air diffusers 29. The spaced arms 116 have passages 117 and 118 for carrying a cooling medium, and these passages are connected to the conduits 33 and 34 respectively.

A structure 119 is provided which is similar to the structure 93 except that the structural members 108 are omitted. This form of the invention also omits the light diffusers 94 and 95. Passages 120 and 121 are disposed at each side of the structure 119, and these passages are connected to the conduits 110 and 111 to carry the cooling medium. An electrical raceway 122 is formed in the structure 119 which is adapted to carry electrical wires.

A structure 123 is also provided which is similar to the structure 114 shown in FIGURE 22 except that the structural members 112 together with the light diffusers 94 and 95 are omitted.

Figure 29:
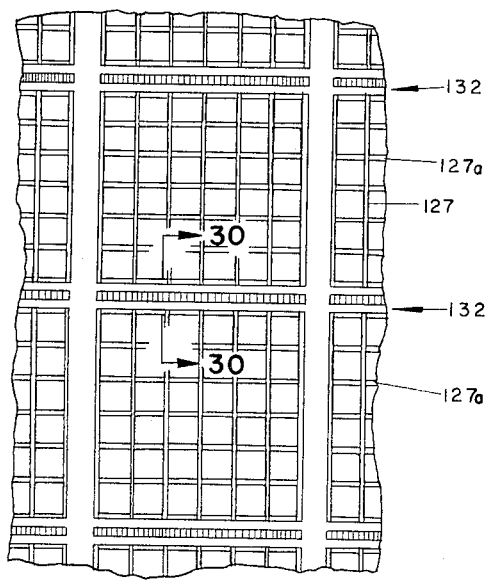
FIGURE 29 is a schematic view showing the gridlike pattern of the ceiling components of FIGURE 28 as viewed below the ceiling.
Figure 30:
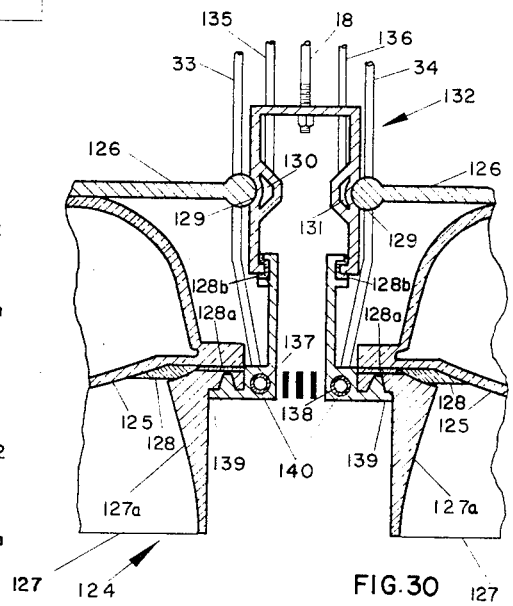
FIGURE 30 is a cross-sectional view taken along line 30—30 of FIGURE 29.

Referring to FIGURES 28 to 30, inclusive, there is shown a form of the ceiling system which utilizes a plurality of relatively thin lighting fixtures 124 that are suspended from the cellular steel deck-panel 11. Each fixture 124 mounts a flat-type fluorescent tube 125 and has a heat absorbing plate 126, the lower surface of which is in contact with the upper surface of the tube 125. The fixture 124 also has a louvered light diffuser comprising a plurality of spaced, parallel bars 127 of a heat conductive material mounted below the tube 125 and a plurality of grid pieces 127a arranged between the bars 127 to form a grid as shown in FIGURE 29. The bars 127 together with the grid pieces 127a are thermally insulated from the tube 125 by insulators 128.

The flat-type fluorescent tube 125 is of the high intensity type and has a high concentration of energy. The configuration of the tube 125 is such that cooling with circulated air is impractical because of the great quantity of air required, and even if air cooling were used it would prove unsatisfactory because of the difficulty in maintaining an even temperature across the tube in moving air streams as well as the difficulty in controlling the color of the emitted light due to uncontrollable temperature variations.

Inasmuch as the heat absorbing plate 126 is in contact with the upper surface of the tube 125, the heat is removed by conduction at a relatively uniform rate, and the surface temperature of the tube 125 may be maintained within an optimum 10° F. range to achieve maximum light output as well as a uniform color. Also as the space within the enclosure increases and additional fixtures 124 are added, the temperature of the conditioned air supplied to the space need not be changed because of the additional tubes 125.

Each plate 126 is headed at its ends and nests in oppositely facing concave recesses 129 located immediately adjacent passages 130 and 131 within a supporting structure 132 in much the same manner as the perforated ceiling panels shown in FIGURE 18 are supported. Cooled water in a supply header conduit 133 is circulated through the passages 130 and 131 to a return header conduit 134 by vertical conduits 135 and 136. The header conduits 133 and 134 form a portion of a second stage of the building heat transfer system which circulates cooled water from a source such as a cooling tower at a temperature within the range of 85° to 95° F. around the enclosed spaces within the building. Conditioned air is supplied to and removed from the space enclosed by the building by flexible ducts 25 that are mounted on the upper surface of the structure 132.

In addition to the cooling tower water in the supply header conduit 133 and return header conduit 134, the building heat transfer system includes a source of refrigerated water in its first stage that is chilled to a temperature in the range of 65° to 75° F. This chilled water is circulated through the supply header conduit 35 and the return header conduit 36 as previously described. The supporting structure 132 includes passages 137 and 138 in the lowermost end thereof for cooling the bars 127. This cooling is accomplished by connecting the passage 137 to the supply header conduit 35 through the conduit 33, and the chilled water is returned to the first stage of the building heat transfer system from the passage 138 through the conduit 34 that is connected to the return header conduit 36.

In some installations it may be desirable to utilize temperature staging wherein only chilled water from a refrigerator is used. In such structures the passages 137 and 138 are connected to the passages 130 and 131 in such a manner that the chilled water circulates through the lower passages first. After the temperature of the water is raised by absorbing heat from the bars 127 the higher temperature water is then circulated through the passages 130 and 131.

Outwardly extending flanges 139 located adjacent the passages 137 and 138 serve to support the adjacent bars 127 which are in thermal contact with the supporting structure 132, and the outermost grid pieces 127a are likewise supported on the flanges 139. The marginal surface portions of the tubes 125 are thermally insulated from the bars 127 and grid pieces 127a by insulators 128a while the lower portions of the structure 132 are thermally insulated from the upper portion by insulators 128b. The bars 127 remove heat from the tubes 125 as well as from the space below by radiation, and this heat is transmitted along the bars 127 by conduction to the water in the passages 137 and 138. Likewise the grid pieces 127a remove heat from both the aforementioned sources by radiation and transmit this heat to the bars 127 by conduction.

It may be desirable to increase the temperature of the heat transfer medium in the passages 137 and 138 within some of the supporting structures 132 located in various zones of the building at certain times of the day. This is accomplished by providing auxiliary electric heaters 140 of the resistance type in the passages 137 and 138 to heat the water as it is circulated therethrough. A current is supplied from a source 141 of electrical power to lines 142 and 143 connected to the heaters 140 in response to a signal from a thermostat 144 located within the zone beneath the fixture 124. Thus the thermostat 144 controls the heating of the space below the tubes 125 by enabling the temperature of the grid formed by the bars 127 and the grid pieces 127a to change from a low level for cooling to an intermediate level to provide a neutral surface and thence to a relatively high level for full heating. This is accomplished with no changes in the flow of the water in the passages 137 and 139, and consequently no flow control valves are required in the conduits 33 and 34.

The ceiling system disclosed in FIGURES 31 to 34, inclusive, utilizes a plurality of relatively thin lighting fixtures 145 that are similar to the fixtures 124, and as pointed out above in connection with the fixtures 124 it is desirable to control the surface temperature of the tubes 125 to operate at the most efficient point for maximum light output. The fixture 145 mounts a flat-type fluorescent tube 125 that is in thermal contact with a heat conductor 146 having turned down end portions.

In contrast with the ceiling system shown in FIGURES 28 to 30, the embodiment of FIGURES 31 to 34 does not utilize refrigerated water. Instead only cooling tower water from the second stage of the building heat transfer system is circulated through the headers 133 and 134, and this water preferably has a temperature of between 85° to 95° F., although in some installations the temperature may be considerably higher. The cooling water is circulated through passages 147 and 148 in the bottom portion of a supporting structure 149 which mounts the downwardly curved ends of the heat conductor 146 as well as the ends of adjacent bars 127 and outermost grid pieces 127a. The bars 127 together with the grid pieces 127a are thermally insulated from the tubes 125 by insulators 128 while marginal portions of the tubes are thermally insulated from the adjacent structure by insulators 128a. The ends of the heat conductors 146 are in direct thermal contact with the bottom portion of the structure 149, and heat is transmitted from the conductors 146 to the cooling medium in the passages 147 and 148.

A plurality of thermojunctions 151 are supported on outwardly directed flanges 150 between the passages 147, 148 and the adjacent bars 127. A group of thermojunctions 151 is shown in FIGURE 34, and each thermojunction comprises p-type semiconductor elements connected to n-type semiconductor elements by electrically conducting plates 151a and 151b. The p-type elements as well as n-type elements can be of $Bi_2Te_3$ or of PbTe, and while these elements have a figure of merit Z of 2 or 3 it is contemplated that elements having values for Z of 5 and even 7 may be used. However, the instant invention is not specifically concerned with the identity of the p- and n-type elements.

A current may be passed through the p- and n-type elements and the plates 151a and 151b from source 152 of direct current through lines 153 and 154 in a well-known manner to form cold junctions toward the plates 151a while hot junctions are formed in the side toward the plates 151b when it is desired to increase the temperature of the zone located below any fixture 145. In this instance the heat is transferred from the cooling tower water in the passage 148 to the louvered diffuser formed by the bars 127 and grid pieces 127a even though this water cools the conductor 146 and the tube 125.

When it is desired to cool the zone below any certain fixture 145 to a degree greater than that normally obtained from the cooling tower water in the passages 147 and 148, a current is passed in the opposite direction from another source 155 of direct current through lines 156 and 157 by actuating a suitable switch 158 which forms cold junctions toward the plates 151b and hot junctions toward the plates 151a. Heat is transmitted from the bars 127 to the water in the passages 147 and 148. The thermojunctions 151 are electrically insulated from both the louvered grid formed by the bars 127 together with the grid pieces 127a and the bottom portion of the structure 149 by insulators 159a. Likewise the thermojunctions 151 are electrically and thermally insulated from the flanges 150 by insulators 159b. The transfer of heat from the plates 151a to the water in the passages 147 and 148 is aided by suitable fins 160.

The ceiling system disclosed in FIGURES 35 to 40 utilizes a plurality of spaced luminaries 161 suspended from deck-panels by hanger rods 18. Each luminaire 161 mounts one or more sources of artificial light in the form of lamps 39 which may be either a high output or a slim type fluorescent tube. The luminaire 161 includes a housing 162 of a heat conductive material such as metal for enclosing one or more ballasts 163 which supplies electrical power to the lamps 39.

Figures 36, 37:
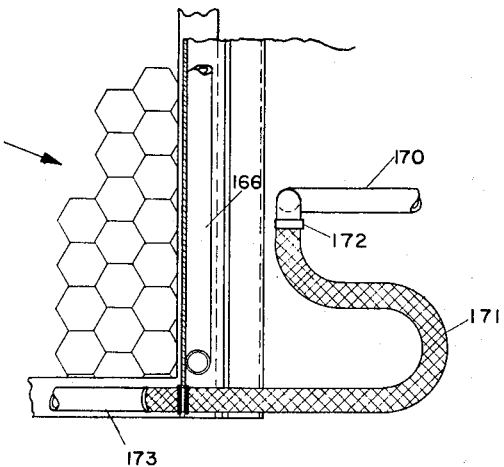
FIGURE 36 is a cross-sectional view taken along the line 36—36 in FIGURE 35.
FIGURE 37 is a plan view of a portion of the fixture taken along the line 37—37 in FIGURE 36.
Figure 39:
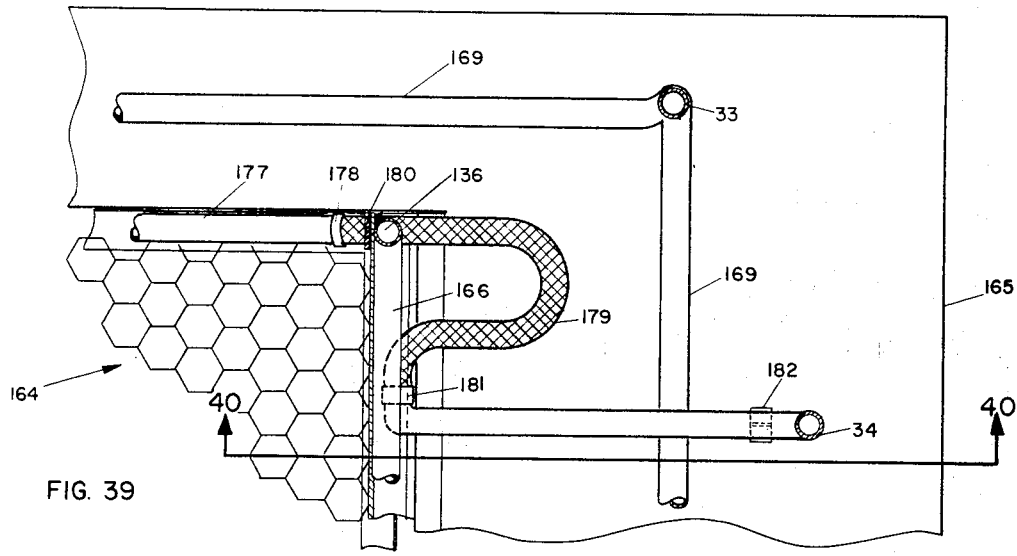
FIGURE 39 is a plan view of a portion of the lighting fixture taken along the line 39—39 in FIGURE 38.

Mounted immediately below the housing 162 is a louver 164 which comprises a plurality of heat conductors arranged in a grid-like formation as shown in FIGURES 37 and 39 to provide a maximum viewing area for heat removal. More particularly, the total surface area of the louver 164 that is exposed to both the lamps 39 and the space below the luminaire 161 is greater than the surface area of a flat plate having the same projected area. By mounting the louver 164 in the opening in the bottom of the housing 162 the geometry is such that the louver 164 "sees" more of the space below the luminaire 161 than it does of the lamps 39. However, the heat removal requirements of the upper and lower surfaces of the louver 164 are balanced because the space below the luminaire 162 is at a lower temperature than the lamps 39.

A plate 165 of a heat conductive material extends outwardly from the outer peripheral surface of the lower portion of the housing 162 that is adjacent the louver 164, and each plate 165 is positioned in the space between adjacent luminaires 161 to cool both the space within the building enclosure and the louver 164. As shown in FIGURES 36 to 40, the plate 165 has offset marginal edge portions which engage outwardly turned flanges on the lowermost portion of the housing 162.

Figure 38:
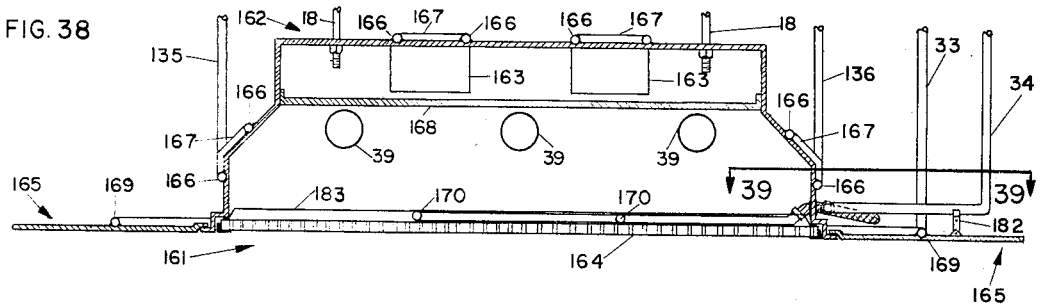
FIGURE 38 is a cross-sectional view of the lighting fixture taken along the line 38—38 in FIGURE 35.

A plurality of spaced parallel tubes 166 are mounted in thermal contact with the housing 162 as shown in FIGURE 38, and the tubes 166 are in communication with one another by connecting tubes 167 located at the opposed ends of the housing 162. Cooled water from a suitable source such as a cooling tower is supplied to the tubes 166 and 167 by the vertical conduit 135 to cool the housing 162 which, in turn, cools the lamps 39. The cooled water is returned to the building heat transfer system by the vertical conduit 136 shown in FIGURES 38 to 40. A removable plate 168 of a heat conductive material is positioned within the housing 162 between the ballasts 163 and the lamps 39 as shown in FIGURE 38 to radiantly cool these sources of heat, and the absorbed heat is conducted to the housing 162.

Figure 35:
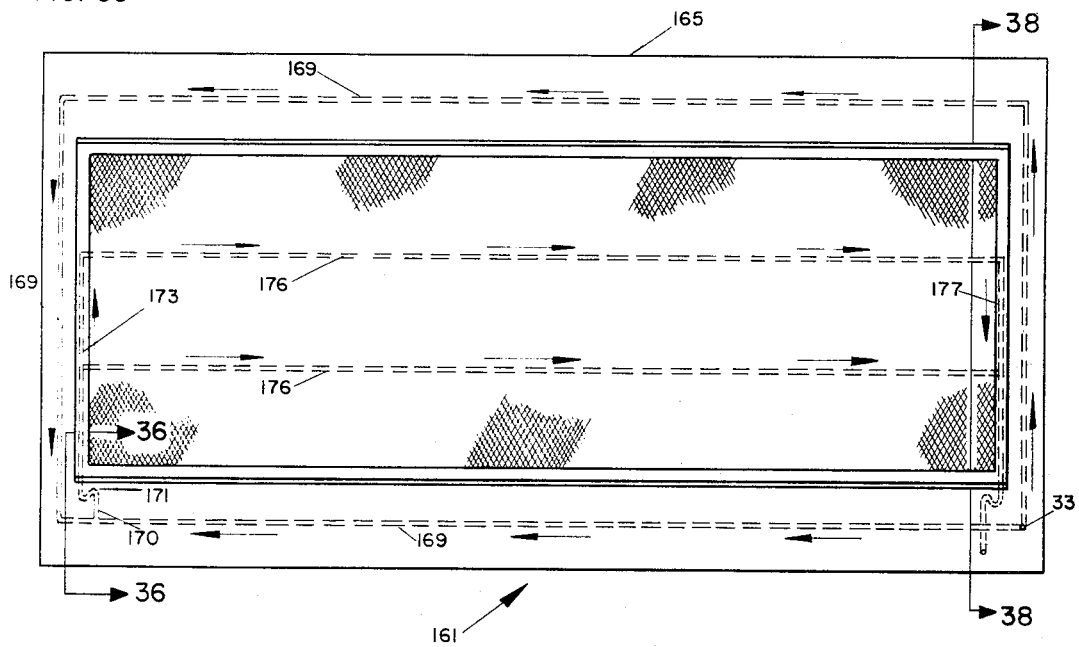
FIGURE 35 is a bottom view of a lighting fixture constructed in accordance with the invention.

A plurality of tubes 169 is mounted on the upper surface of the plate 165 as shown in FIGURE 38 and the tubes 169 completely encircle the housing 162 as shown in FIGURE 35. The tubes 169 are connected to a supply of chilled water in the building heat transfer system by the conduit 33, and the water flows from the conduit 33 to a short connector 170 through the tubes 169 in the direction of the arrows shown in FIGURE 35. The short connector 170 extends from one of the tubes 169 and is connected to a flexible tube 171 by a fitting 172. The flexible tube 171 extends through the housing 162 and is connected to a louver supply header 173 which is located within the housing and extends transversely across one end thereof as shown in FIGURE 35. The tubing 171 is of a flexible material to enable the louver 164 to be rotated downwardly for access to the lamps 39. The flexible tube 171 is connected to the louver supply header 173 by a fitting 174 and is thermally insulated from the housing 162 by a suitable bushing 175.

Chilled water from the tubes 169 flows through the louver supply header 173 in the direction of the arrow shown in FIGURE 35, and this water then flows through spaced louver tubes 176 that are in thermal contact with the louver 164 as shown by the arrows in FIGURE 35. The louver tubes 176 extend longitudinally along the upper surface of the louver 164 between the louver supply header 173 and a louver return header 177.

The chilled water removes heat from the louver 164 and moves in the direction of the arrow shown in FIGURE 35 along the louver return header 177 to a fitting 178 that connects the header end to a flexible tubing 179 extending through a bushing 180 in the housing 162. The opposite end of the flexible tubing 179 is connected to the return conduit 34 by a fitting 181, and a horizontally extending leg of the return header conduit 34 is supported by a bracket 182 on the upwardly facing surface of the plate 165. Temperature staging wherein the same water is utilized to cool both the louver 164 and the lamps 39 may be provided by connecting the fitting 181 to the tubes 166. With such an arrangement the chilled water first absorbs heat from the louver 164 and then this same water at a higher temperature is circulated through the tubes 166.

An important feature of the invention is the provision of a film 183 of a transparent plastic material which functions as a shield to reflect the infrared portion of the light emitted from the lamps 39 back to the interior surface of the housing 162. Thus the portion of the heat in the infrared range is removed in the most economical manner by the cooling tower water in the tubes 166 which is at a higher temperature than the chilled water in the louver tubes 170. The film 183 also reduces convection currents within the housing 162 thereby enabling the lamps 39 to be operated at an optimum temperature controlled by the cooling medium in the tubes 166.

Figure 40:
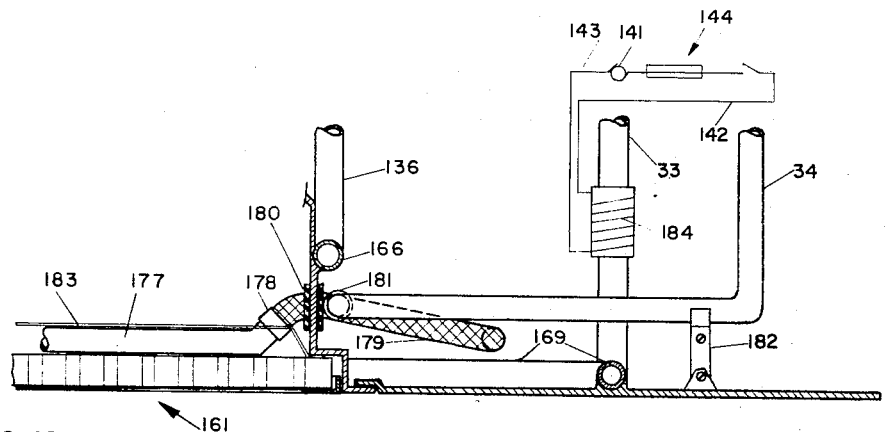
FIGURE 40 is a cross-sectional view of a portion of the lighting fixture taken along the line 40—40 of FIGURE 39.

As in the case of the system shown in FIGURES 28 to 30 it may be desirable to increase the temperature of the water in the tubes 169 and 176 of some of the luminaires 161 located in various zones of the building at certain times of the day. An auxiliary electric heater 184 is mounted in thermal contact with the conduit 33 as shown in FIGURE 40, and a current is supplied from the source 141 of electrical power to the lines 142 and 143 which are connected to the heater 184 in response to a signal from the thermostat 144. As in the embodiment of FIGURES 28 to 30 the thermostat 144 controls the heating of the space below the luminaires 161 without changing the flow of the water in the tubes 169 and 176.

The louver 164 serves not only to diffuse the light and remove heat from the lamps 39 but also to remove heat from the space below the luminaire 161. The quantity of heat per hour which one square foot of the louver 164 can remove is dependent upon the difference in average temperature between the louver 164 and the water in the louver tubes 176 as well as the headers 173 and 177. Table I below lists the cooling capacity of a typical louver in B.t.u.'s per hour per square foot at various water temperature differentials.

TABLE I

| Louver cooling capacity B.t.u./hr./sq. ft.: | Average temperature differential; ° F. |
|---|---|
| 5 | 0.2 |
| 10 | 0.9 |
| 15 | 1.8 |
| 20 | 2.5 |
| 25 | 3.4 |
| 30 | 4.2 |
| 35 | 5.1 |
| 40 | 5.9 |

To illustrate the economy of utilizing cooling tower water to remove heat from the luminaire housing and chilled water to remove heat from the louver, Table II below lists the power input to the building refrigeration equipment measured in watts per hour per square foot of space cooled together with the space heating load in B.t.u.'s per hour per square foot of louver that is removed by the louver at various levels of illumination measured in footcandles. The values set forth in Table II are based on the luminaires being mounted in a room having a nine-foot ceiling, four changes of air per minute with a uniform temperature of 63° F. Each luminaire mounts either one or two fluorescent tubes which are either the slim or the high output type. The power input is listed for the various luminaires when (a) neither the housing nor the luminaire is cooled, (b) both the housing and the louver are cooled by chilled water from the refrigeration equipment, and (c) when the housing is cooled by water from the cooling tower and the louver is cooled by chilled water from the refrigeration equipment.

TABLE II

| Tubes per Fixt. | Tube Type | Level of Illum. | Space Load Removed | Refrigeration Input | | |
|---|---|---|---|---|---|---|
| | | | | Not Cooled | Chilled Only | Cooled and Chilled |
| One | Slim | 50 | 11.2 | 1.35 | 1.15 | 0.75 |
| One | do | 100 | 15.35 | 2.40 | 2.05 | 1.15 |
| One | do | 150 | 19.20 | 3.35 | 2.85 | 1.50 |
| Two | do | 50 | 8.80 | 1.35 | 1.10 | 0.65 |
| Two | do | 100 | 9.80 | 2.15 | 1.80 | 0.90 |
| Two | do | 150 | 10.80 | 2.95 | 2.45 | 1.10 |
| One | HO | 50 | 9.40 | 1.30 | 1.10 | 0.70 |
| One | HO | 100 | 11.00 | 2.00 | 1.15 | 0.95 |
| One | HO | 150 | 12.70 | 2.80 | 2.40 | 1.10 |
| Two | HO | 50 | 7.30 | 1.25 | 1.15 | 0.60 |
| Two | HO | 100 | 6.70 | 1.95 | 1.70 | 0.75 |
| Two | HO | 150 | 6.30 | 2.70 | 2.30 | 0.90 |

Table III illustrates the effect of the air conditioning and lighting systems on the total cost of building construction as the lighting level is increased from the conventional 75 footcandles to 150 footcandles using either conventional luminaires or the integrated water cooled luminaires of the present invention. Buildings ranging in total construction costs of $18, $20 and $25 per square foot of floor area at 75 footcandles are used as a basis of the comparison, and luminaires using two tubes are used in all of the comparisons. The lighting and air conditioning costs are listed as percents of the total building cost.

TABLE III

| (A) 75 Footcandles Illumination: | | | |
|---|---|---|---|
| Total building cost, $/ft.$^2$ | 18 | 20 | 25 |
| Lighting cost, percent TBC | 13.4 | 12.1 | 9.7 |
| Air conditioning cost, percent TBC | 19.8 | 17.9 | 14.3 |
| (B) 150 Footcandles Illumination: | | | |
| (1) Conventional luminaires: | | | |
| Lighting cost, percent TBC | 20.7 | 18.7 | 15.0 |
| Air conditioning cost, percent TBC | 31.0 | 27.9 | 22.3 |
| Cost increases, percent TBC: | | | |
| Lighting | 7.3 | 6.6 | 5.3 |
| Air conditioning | 11.2 | 10.0 | 8.0 |
| Architectural | 0.4 | 0.4 | 0.4 |
| Total | 18.9 | 17.0 | 13.7 |
| Air conditioning operation, percent | 51 | 51 | 51 |
| (2) Integrated Water Cooled Luminaires: | | | |
| Lighting cost, percent TBC | 23.9 | 21.5 | 17.2 |
| Air conditioning cost, percent TBC | 16.1 | 14.5 | 11.6 |
| Cost increases, percent TBC: Lighting | 10.5 | 9.4 | 7.5 |
| Cost Savings, percent TBC: | | | |
| Air conditioning | 3.7 | 3.4 | 2.7 |
| Architectural | 2.0 | 2.1 | 2.3 |
| Total increase | 4.8 | 3.9 | 2.5 |
| Air conditioning operation, percent | 33 | 33 | 33 |

While various preferred embodiments of the invention have been shown and described, various modifications can be made to the disclosed structure without departing from the spirit of the invention or the scope of the subjoined claims.

I claim:

1. In a building having a plurality of luminaires mounted adjacent ceilings therein with sources of artificial light within a housing on each luminaire for illuminating the space therebelow; the improvement comprising a member extending along the bottom of said housings between said light source and said space therebelow for receiving heat therefrom, first conduits in thermal contact with said housing, second conduits in thermal contact with said member, a plurality of first pipes for circulating a liquid heat transfer medium at a temperature within a first range around the spaces in the building, a plurality of second pipes for circulating a liquid heat transfer medium at a temperature within a second range higher than said first range around said spaces, first liquid carrying means connecting said first conduits to said second pipes, and second liquid carrying means connecting said second conduits to said first pipes.

2. Apparatus as in claim 1, wherein the liquid in said first pipes is at a temperature within the range between 65° and 75° F., the liquid in said second pipes is at a temperature within the range between 85° and 95° F., and including a transparent film between said member and said sources for reflecting heat in the infrared range back to said housing.

3. Apparatus as in claim 2, including means for connecting said first pipes to a refrigerating machine, and means for connecting said second pipes to an evaporative cooling means.

4. Apparatus as in claim 1 which further includes a plurality of thermo-electric junctions in heat exchange relationship with said member for selectively transmitting heat between said member and said heat transfer medium.

5. A lighting fixture for an enclosed space, comprising, in combination, support means for mounting a source of artificial light, a light reflecting panel positioned generally around said light source mounted in said support means and effective to reflect the light from said light source downwardly into said space below said fixture while preventing direct transmission of light from said source to said space and to intercept substantially all radiant heat from said light source, a light diffusing panel positioned below said fixture whereby said reflected light from said reflecting panel is diffused prior to entering said space, a first fluid filled cooling means in direct thermal contact with said reflecting panel whereby said light source and said space are cooled thereby, a second fluid filled cooling means for removing heat from said diffusing panel, and means for circulating a fluid cooling medium from said second cooling means to said first cooling means.

6. A lighting and cooling fixture for an enclosed space, comprising, in combination, a housing adapted to be mounted above said space, said housing including means for mounting at least one light source therein, a light reflector panel extending across the top of said housing above the position of said mounted light source and partially across said housing below said mounted light source whereby the light from said light source is indirectly transmitted to said space below said housing, a light transmitting and diffusing means below said mounted light source and extending across said housing whereby said reflected light entering said space is diffused by said transmitting and diffusing means, a first fluid filled cooling means in thermal contact with said light reflector panel and a second fluid filled cooling means in thermal contact with said transmitting and diffusing means, and means for circulating a fluid cooling medium from said second cooling means to said first cooling means.

7. The fixture of claim 6 which further includes a plurality of thermo-electric junctions in heat exchange relationship with said light transmitting and diffusing means for selectively transmitting heat between said transmitting and diffusing means and said fluid cooling medium.

8. In a building having a plurality of luminaires mounted adjacent ceilings therein with sources of artificial light within a housing on each luminaire for illuminating the space therebelow; the improvement comprising a member extending along the bottom of said housings between said light source and said space therebelow for receiving heat therefrom, first conduits in thermal contact with said housing, second conduits in thermal contact with said member, a plurality of first pipes for circulating a heat transfer fluid at a temperature within a first range around the spaces in the building, a plurality of second pipes for circulating a heat transfer fluid at a temperature within a second range higher than said first range around said spaces, first fluid carrying means connecting said first conduits to said second pipes, and second fluid carrying means connecting said second conduits to said first pipes.

References Cited

UNITED STATES PATENTS

| | | | |
|---|---|---|---|
| 2,284,194 | 5/1942 | Gangbin | 240—9 |
| 2,798,943 | 7/1957 | Prideaux | 240—47 |
| 2,887,564 | 5/1959 | Baran | 240—9 |
| 3,090,434 | 5/1963 | Benson et al. | 240—9 |
| 3,099,403 | 7/1963 | Strawick | 240—47 |

NORTON ANSHER, *Primary Examiner.*

RICHARD M. SHEER, *Assistant Examiner.*